Oct. 11, 1927.

E. D. BROWN 1,645,124

BRAKE MECHANISM FOR AUTOMOBILES

Original Filed Sept. 30, 1925    2 Sheets-Sheet 1

Edgar D. Brown
INVENTOR

BY Munro Cameron & Lewis Kerkam
ATTORNEYS

Oct. 11, 1927.
E. D. BROWN
1,645,124
BRAKE MECHANISM FOR AUTOMOBILES
Original Filed Sept. 30, 1925  2 Sheets-Sheet 2
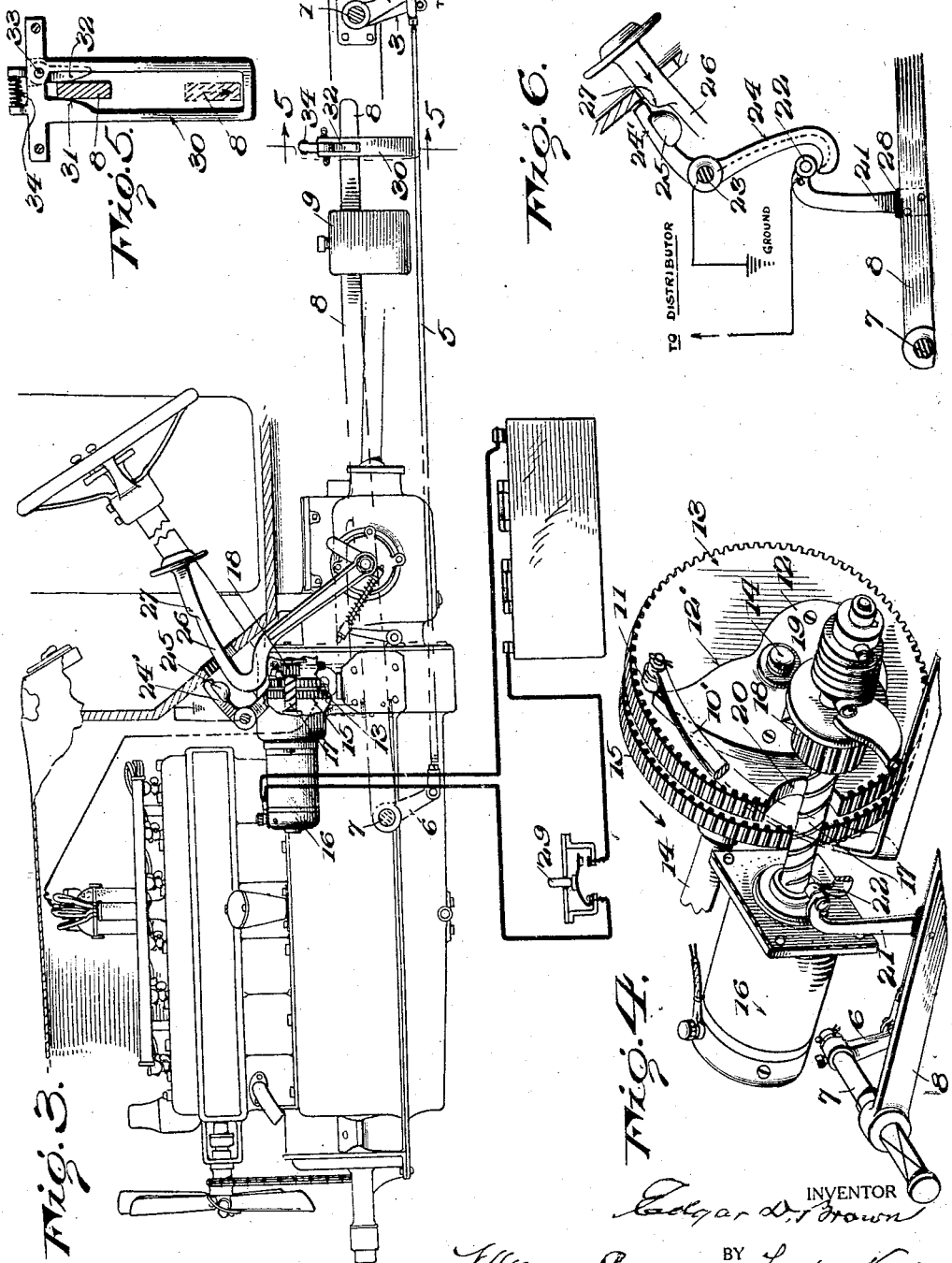

Patented Oct. 11, 1927.

1,645,124

UNITED STATES PATENT OFFICE.

EDGAR D. BROWN, OF POTTSVILLE, PENNSYLVANIA.

BRAKE MECHANISM FOR AUTOMOBILES.

Application filed September 30, 1925, Serial No. 59,648. Renewed February 25, 1927.

This invention relates to brake mechanism for automobiles, and has for its object to provide an improved brake mechanism having a source of power, normally held in restraint, for applying the brakes, and means under the ready control of the operator, preferably without removing his hands from the steering wheel, for releasing the power to permit the same to automatically apply the brakes.

A further object is to provide an improved brake mechanism having a source of power for applying the brakes, with means for automatically releasing the brakes when starting the engine and holding the brakes released with the power mechanism under restraint until again applied at the will of the operator.

With these objects in view, the invention consists in the usual or any suitable brake, applied either to the rear wheels, or the forward wheels, or both if desired, and any suitable source of power as, for example, a weighted lever, which is normally held in inoperative position with the brakes released, and means, such as a foot lever, for releasing the power device which then operates through suitable connections to apply the brakes. When the power device takes the form of a weighted lever, said lever is preferably held in elevated position, to hold the brakes in release, by means of a suitable catch in position to be readily tripped by the operator. This trip action may be secured by a variety of devices. Preferably, as here shown, such tripping action is accomplished through the medium of the clutch lever which is so arranged that upon suitably depressing the clutch lever the catch mechanism is tripped and the power, as for example the weighted lever, is released and the brakes automatically applied through suitable connections from said lever to the brake.

In order to insure the release of the brakes upon the starting of the engine, and before the clutch is thrown into action, suitable means for relieving the brake mechanism of the action of the power device is provided, which means may take any suitable form, depending upon the character of the power mechanism employed. As herein shown for the purpose of illustrating the invention, the weighted lever which constitutes the power mechanism for applying the brakes is so connnected to a Bendix drive, constituting a part of the self-starter for the engine that, on the initial operation of the Bendix drive, the power, as for example the weighted lever, is thereby thrown into released or inoperative position and automatically caught and held in such position by the trip mechanism under the control of the clutch lever as indicated above.

Preferably, means are provided whereby, while the brakes are applied, the electrical circuit to the spark plugs, as through the distributor, is open, but is automatically closed upon the release of the brakes. In the form of the invention herein illustrated, the circuit to the distributor passes through the trip mechanism when the latter is closed and acting to hold the brakes in release and, when said mechanism is tripped to apply the brakes, the trip is opened and the circuit is broken; reversely, when the brakes are released, the trip mechanism is again closed thereby closing the circuit to the distributor. By this means it is impossible to start the engine with the brakes applied.

The inventive idea is capable of receiving a variety of mechanical expressions, one of which, for the purpose of illustrating the invention, is shown in the accompanying drawings, but it is to be expressly understood that such drawings are for the purpose of illustration only and are not designed to define the limits of the invention, reference being had to the appended claims for that purpose.

In said drawings—

Fig. 3 is a broken detail in side elevation, showing the application of the invention with the battery and connections therefrom to the Bendix drive shown diagrammatically;

Fig. 4 is a detail in perspective, showing the connection of the power mechanism with the self-starter of the Bendix drive;

Fig. 5 is a section on the line 5—5 of Fig. 3, showing the means employed for steadying the weighted lever and preventing rattle thereof when the brakes are released;

Fig. 6 is a detail in side elevation of the trip mechanism for holding the brakes in release or applying the same.

Figure 1:
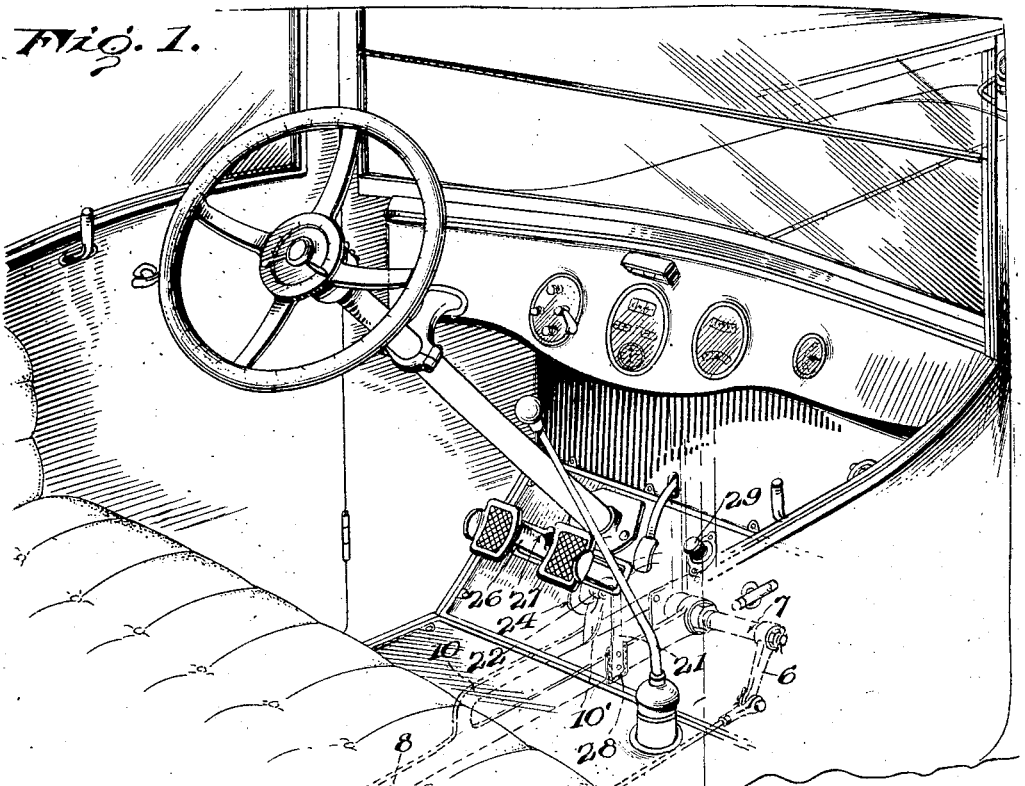
Fig. 1 is a broken perspective view of a portion of an automobile showing the invention applied thereto.

In said drawings, in which like reference numerals indicate like parts throughout the several views, 1 indicates the usual or any suitable rock shaft, taking bearing in the frame of the machine, from which rods 2 extend to the brakes, here shown as rear brakes. It will be readily understood that there are two of such rods, one on either side of the machine, the one on the right-hand side being shown in Fig. 1. The rods 2 are connected to the rock shaft 1 by crank arms 3 rigidly keyed to the shaft, and a crank arm 4 likewise rigidly keyed to the shaft 1 is connected to a forwardly extending rod 5, which in turn is connected to a crank arm 6 keyed to a stub or other suitable rock shaft 7. Upon rocking the shaft 7, the necessary motion is imparted to the brake rod 2 to apply or release the brake as the case may be. All this is the usual and well known construction, and the rocking of the shaft 7 has heretofore been accomplished by means of a brake lever extending upwardly into the machine in a position to be controlled by the operator. According to the present invention, any suitable source of power, here shown as a rearwardly extending lever 8, having the weight 9 adjustably carried thereby, is applied to the rock shaft 7. When the weighted lever 8 is free to fall, the shaft 7 is rocked to apply the brakes, and when the said lever is raised, the rock shaft 7 is turned in the direction to release the brakes. For the purpose of controlling these movements of the lever 8, there is, in the present instance, applied to said lever a compound arm 10, 10'. The portion 10 of said arm is connected to said lever 8 some considerable distance to the rear of the rock shaft 7 and extends forward and parallel with the lever 8. The element 10' of said compound lever (which if desired could be attached directly to lever 8) is turned at right angles to the element 10 and lever 8 and is curved upwardly and laterally and bears on its upper outer end a roller 11. This roller contacts with a cam 12, a portion of which is shown in Fig. 2, but which is shown more completely in Fig. 4, in each of which figures the parts are shown in the position which they occupy when the brakes are released. The cam 12 has a face 12' so shaped that when the lever arm 10' falls or moves downwardly, carrying with it the roller 11, the latter wipes the cam face 12' and moves it slightly to the left of the position shown in Fig. 4. This cam 12 is rigidly secured to a gear wheel 13 mounted to turn with close frictional contact on the shaft 14, on which shaft is keyed or otherwise rigidly secured the gear wheel 15 which is the ordinary fly wheel of the engine operated by a self-starter of the Bendix type well known in the art.

The motor 16 of the Bendix drive is provided, as is usual with such drive, with a quick threaded shaft 17 upon which is mounted a gear 18 which, when the motor 16 is energized, is moved from right to left (in Fig. 4) and thrown into gear with the wheel 15, and thereby starts the automobile engine. The gear wheel 18 is of sufficient width to simultaneously engage, under proper conditions, the gear teeth of the two gear wheels 13 and 15, which wheels are of the same diameter and geared alike. It will, of course, be understood that the gear wheel 18 moves from right to left, when the motor 16 is energized, against the tension of the spring 19. When the motor 16 stops, the gear 18 is returned by the spring 19 to its normal position shown in Fig. 4.

The gear wheel 13 has a cutaway portion 20 in its periphery and, when the brakes are released with the parts shown in the position of Fig. 4, this cutaway portion is in such a position that the gear wheel 18, in moving from left to right, is out of gear with the gear 13. However, when the brakes are released and the brake lever 8 falls, it carries the compound lever 10, 10' and with it the roller 11 downwardly, and said roller contacting with the cam face 12' moves the gear wheel 13 slightly to the left (as shown in Fig. 4) so as to bring the gear teeth thereon into position to be engaged by the Bendix gear 18, when the motor 16 is again energized, and when thus engaged the gear 18 revolves the gear wheel 13 until the cut out portion 20 is brought opposite the gear 18 when the two are then thrown out of gear. It will thus be seen that the slight forward movement imparted to the gear wheel 13 through the medium of the roller 11 and the cam 12', plus the movement imparted to the gear 13 by the gear 18, effects one complete revolution of the former, so that the cutaway portion 20, when the brakes are released, is always in such a position as to leave a free passage for the gear 18 from the gear 15 back to its normal position shown in Fig. 4.

Attached to the lever 8 near its forward end is an upwardly extending arm 21 having its upper end turned slightly forward and carrying a roller 22. Mounted to turn on a suitable fulcrum 23 is a two-armed lever 24—24'. The upper arm 24' extends rearwardly at an angle from the vertical and is provided with a weight 25 on the under side thereof. Preferably, said weight has a cam face as shown, and the action of the weight is to throw the downwardly depending arm 24 of this catch lever forward where its bent nose engages the roller 22 on the arm 21, and when so engaged acts to hold the brake lever 8 in its elevated position and with the brakes released. In order to apply the brakes, it is only necessary to trip the lever 24—24'. This may be accomplished in any suitable way and with any suitable mechanism under the control of the operator. Preferably, and as here shown, this tripping action is accomplished through the medium of the clutch lever 26 which is provided with a cam face 27 (Figs. 3 and 6) so positioned that when the clutch lever is forced well in or down, the cam 27 wipes the under face of the weight 25 and thereby acts to trip the lever 24—24', permitting the brake lever 8 to fall and apply the brakes. Any other suitable mechanism for effecting this tripping action would be within the spirit of the invention. When the brake lever 8 is raised to release the brakes, the roller 22 wipes the nose of the trip arm 24 and is reengaged thereby as will be readily understood.

Preferably, means are provided whereby the current flowing from the battery through the distributor to the spark plugs is interrupted or broken when the brakes are applied, the circuit being, however, automatically closed when the brakes are released. As one means of effecting this, the circuit passes through the fulcrum 23 of the trip lever 24—24', through the arm 24, the arm 21, which is insulated at 28, and thence on to the distributor, as will be clearly understood by reference to Fig. 6. It will be observed that, when the brakes are applied, the circuit would be broken because the roller 22 would be out of contact with the trip arm 24, but when the brakes are released the parts would occupy the position shown in Fig. 6, thereby closing the circuit to the distributor.

Figure 2:
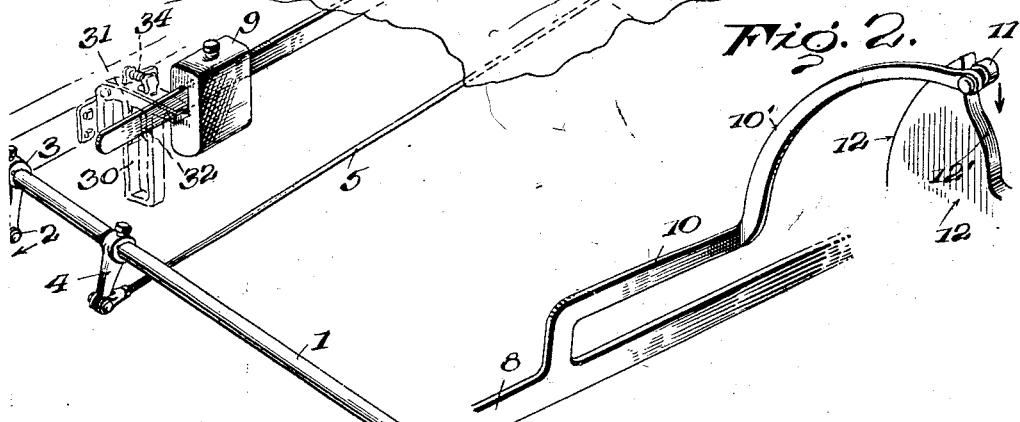
Fig. 2 is a detail perspective of a portion of the weighted lever and of a cam operated thereby upon the application of the brakes and in turn operating the lever upon the release of the brakes.

To start the engine, the operator steps on the starter button 29, Fig. 1, (diagrammatically shown in Fig. 3) and closes the circuit to the motor of the Bendix drive, thereby energizing the latter, throwing the gear 18 to the left from the position shown in Fig. 4, and the gear wheel 13 having been slightly turned to the left by the depression of the lever arm 10' (when the brakes were applied) and the action of the roller 11 on the cam face 12', the gear 18 simultaneously meshes with the gears 13 and 15. As before described, it revolves the gear 13 until the cut out portion 20 comes opposite the gear 18; it also simultaneously revolves the gear 15 to start the automobile engine. As the gear wheel 13 is revolved, the roller 11 travels on the face of the cam 12, and, when the cutout portion 20 reaches the position shown in Fig. 4, the roller 11 will have just passed over the upper nose of the cam and assumed the position shown in said figure. This will have raised the brake lever 8 until the catch 24 comes under the roller 22 and holds the lever 8 in its elevated position and the brakes released, and simultaneously closes the circuit to the distributor.

Referring now to Figs. 3 and 5, it will be seen that the rear end of the lever 8 moves up and down in a frame 30. This frame has a cam face 31 rigid thereon and extending inward. Mounted on the frame is a cam-face lever 32 pivoted at 33 and acted on by a spring 34 tending to throw the cam face 32 inwardly toward the cam face 31. When the lever 8 is raised to release the brakes, it is thus held between the two cam faces 31 and 32, thereby preventing rattling of the parts.

From the foregoing, it will be seen that by the present invention there is provided power mechanism which is restrained from action while the engine is operating and which, at the will of the operator, automatically is applied to set the brakes and simultaneously break the circuit to the spark plugs; and which, on the other hand, when the self-starter is energized to start the engine, automatically closes said circuit and relieves the brakes from the effect of said power device and sets the latter in position to be again automatically applied. Furthermore, it will be seen that the invention may be applied to the brake mechanism now in common use without any material reorganization of the parts, and that the brakes may be both applied and released without the operator removing his hands from the steering wheel.

Many variations and modifications of the form of the invention herein shown and described will readily suggest themselves to those skilled in the art. The particular form of power mechanism may be varied as also the particular means for controlling the application and release of said power, and many other modifications may be employed without departing from the spirit of the invention and while still remaining within the limits of the appended claims.

What is claimed is:—

1. In an automobile, the combination of brake mechanism, a weighted lever operatively connected thereto, restraining means normally supporting said lever to hold the brakes off, an ignition circuit leading to the automobile engine through said restraining means but broken when said restraining means are released, and a releasing device cooperating with said restraining means, whereby the brakes are automatically applied and the engine stopped upon the operation of said releasing means.

2. In an automobile, the combination of brake mechanism and means holding the same in release position, with an electric circuit including said holding means and the ignition element of the engine, and means simultaneously applying the brakes and breaking said circuit.

3. In an automobile, the combination of brake mechanism, a source of power, means for applying said power to the brake to set the same, and means including a trip catch restraining the application of said power means, with an electric circuit including said catch and the ignition element of the engine, whereby when the catch is tripped to apply the brake the electric circuit to the engine is broken.

4. In an automobile, the combination of brake mechanism, a power device for applying the same, an electric circuit to the automobile engine, means simultaneously applying said power device and opening said circuit, and a second power device automatically releasing the brakes and closing said circuit.

5. In an automobile, the combination of brake mechanism, and means for applying the same, an electric circuit to the automobile engine which is open when the brakes are applied, and automatic engine-starting brake-releasing circuit-closing means.

6. In an automobile, the combination of brake mechanism, and an electric circuit to the automobile engine, with a power device simultaneously applying the brakes and opening said circuit, and a second power device simultaneously releasing the brakes and closing said circuit.

7. In an automobile, the combination of the automobile engine, an ignition circuit therefor, a starter for said engine, and means operated by said starter and controlling said circuit.

8. In an automobile, the combination of brake mechanism, and a power device including a weighted lever for applying the brakes, and lever-engaging means for said lever when in brake-releasing position, whereby vibration and rattle of said lever is prevented.

9. In an automobile, the combination of brake mechanism, and means for applying the same, and power-driven brake-releasing means comprising an engine starter, a cam driven by said starter and operatively connected to said brake-applying means to release the brakes.

10. In an automobile, the combination of brake mechanism, a weighted lever operatively connected thereto to set the brake, engine-starting mechanism, and operative connections between said lever and starting mechanism, whereby said lever is raised to release the brake.

In testimony whereof I have signed this specification.

EDGAR D. BROWN